(12) United States Patent
Jacobson

(10) Patent No.: US 7,903,108 B2
(45) Date of Patent: *Mar. 8, 2011

(54) METHOD FOR ACCELERATED DETERMINATION OF OCCLUSION BETWEEN POLYGONS

(75) Inventor: Brian Jacobson, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/196,020

(22) Filed: Aug. 21, 2008

(65) Prior Publication Data

US 2008/0309659 A1 Dec. 18, 2008

Related U.S. Application Data

(63) Continuation of application No. 10/986,745, filed on Nov. 12, 2004, now Pat. No. 7,436,414.

(51) Int. Cl.
*G06T 1/00* (2006.01)

(52) U.S. Cl. ......... 345/418; 345/419; 345/420; 345/421; 345/422; 345/426; 345/501; 345/563

(58) Field of Classification Search .......... 345/418–422, 345/426, 427, 441, 582, 620, 629; 348/E13.045, 348/E14.023
See application file for complete search history.

(56) References Cited

U.S. PATENT DOCUMENTS

| | | | |
|---|---|---|---|
| 4,928,250 A | 5/1990 | Greenberg et al. |
| 4,987,554 A | 1/1991 | Kaufman |
| 5,129,051 A | 7/1992 | Cain |
| 5,241,656 A | 8/1993 | Loucks et al. |
| 5,303,340 A | 4/1994 | Gonzalez-Lopez et al. |
| 5,418,897 A | 5/1995 | Capri et al. |
| 5,630,039 A | 5/1997 | Fossum |
| 5,777,625 A | 7/1998 | Rossin |
| 5,877,768 A | 3/1999 | Jain |
| 6,005,574 A | 12/1999 | Herrod et al. |
| 6,052,128 A | 4/2000 | Narayanaswami et al. |
| 6,052,129 A | 4/2000 | Fowler et al. |

(Continued)

OTHER PUBLICATIONS

H. Hey and W. Purgathofer, Occlusion Culling Methods, STAR— State of the Art Report, Eurographics 2001.

(Continued)

*Primary Examiner* — Kimbinh T Nguyen
(74) *Attorney, Agent, or Firm* — Frommer Lawrence & Haug LLP; Jamie L. Wiegand

(57) ABSTRACT

The invention describes a method and system for use in occlusion culling of polygons in an interactive environment, such as a game. The invention employs a boundary box to simplify the testing of occludee polygons. Occluders and occludees are also transformed into non-interpenetrating, non-overlapping polygons. Winged-edges are employed to minimize a per occludee computational cost due to precision problems that may arise at non-overlapping edges. The invention then proceeds through an active edge list to identify edge discontinuities (e.g., where an edge is added or removed from the active edge list). Depth analysis is employed to determine whether an occluder occludes an occludee at the edge discontinuity. Moreover, the invention only performs depth analysis for those locations of a screen display where an occludee is determined to reside, thereby minimizing unnecessary computations.

20 Claims, 12 Drawing Sheets

U.S. PATENT DOCUMENTS

| | | | |
|---|---|---|---|
| 6,088,035 A * | 7/2000 | Sudarsky et al. | 345/421 |
| 6,208,352 B1 | 3/2001 | Blackwell | |
| 6,271,852 B1 | 8/2001 | Kamiyama et al. | |
| 6,356,271 B1 | 3/2002 | Reiter et al. | |
| 6,456,285 B2 * | 9/2002 | Hayhurst | 345/422 |
| 6,894,689 B1 * | 5/2005 | Greene et al. | 345/422 |
| 6,977,652 B2 | 12/2005 | Senda et al. | |
| 7,023,437 B1 * | 4/2006 | Voorhies et al. | 345/420 |
| 7,215,345 B1 | 5/2007 | Hanko | |
| 7,277,102 B2 | 10/2007 | Moore et al. | |
| 7,450,120 B1 * | 11/2008 | Hakura et al. | 345/421 |
| 2002/0063708 A1 | 5/2002 | Senda et al. | |
| 2002/0097241 A1 | 7/2002 | McCormack et al. | |
| 2002/0190995 A1 | 12/2002 | Lim | |
| 2003/0043148 A1 * | 3/2003 | Mei et al. | 345/421 |
| 2003/0112254 A1 | 6/2003 | Ishihara | |
| 2004/0257607 A1 | 12/2004 | Gupta et al. | |
| 2006/0103645 A1 | 5/2006 | Jacobson | |

OTHER PUBLICATIONS

Scan Conversion, Overview of Rendering Scan Conversion, Drawing lines, Drawing Polygons, Angel 7.8-7.10, Carnegie Mellon presentation, pp. 1-13, Nov. 1, 2001.

James D. Foley et al. "Computer Graphics, Principles and Practice," 2nd Edition, 1990, pp. 680-686.

Coorg et al., "A Spatially and Temporally Coherent Object Space Visibility Algorithm," Tech. Report TM-546, Laboratory for Computer Science, MIT; pp. 1-18.

Foley et al., "Computer Graphics, Principles and Practice," 1996; Addison-Wesley Publishing Company; 2nd edition; pp. 68-71, 96-99, 124-127, 545-546, 660-662, 680-685, and 855-856.

Froment "A Compact and Multiscale Image Model Based on Level Sets;" 1999, Scale-Space Theories in Computer Vision, pp. 1-12.

* cited by examiner

METHOD FOR ACCELERATED DETERMINATION OF OCCLUSION BETWEEN POLYGONS

CROSS-REFERENCE TO RELATED APPLICATIONS

This is a continuation of U.S. patent application Ser. No. 10/986,745, entitled "Method For Accelerated Determination Of Occlusion Between Polygons," filed Nov. 12, 2004, under 35 U.S.C. §120 and 37 C.F.R. §1.53(b), and which is incorporated herein by reference.

FIELD OF THE INVENTION

The present invention relates to a virtual environment, and in particular, but not exclusively, to efficient rendering of graphical polygonal models.

BACKGROUND OF THE INVENTION

As many devoted computer gamers may be aware, the overall interactive entertainment of a computer game may be greatly enhanced with the presence of realistic visual effects. However, creating robust and flexible visual effects that are also computationally efficient is a considerable challenge. Such visual effects may be difficult to design, challenging to code, and even more difficult to render.

For example, a visual image that includes a large scene, such as a building interior, a city, mountain, and the like, may involve millions of polygons that need to be drawn. Drawing such a large number of polygons may be a task that is beyond the capacity of many of today's computer hardware systems. One solution to this problem recognizes that usually only a small part of such a scene is actually visible. That is, many of the polygons that comprise the scene may be hidden or occluded by other polygons, or even too far from the viewpoint to be fully recognized. It would therefore be more efficient to determine which parts of the scene are invisible and can be culled. In that way, only a small part of the scene's polygons need to be drawn.

There are a variety of known techniques for lowering the polygon-count and thereby reducing graphics hardware load, including viewing frustum culling, backface culling, and level of detail switching. Briefly, viewing frustum culling involves the removal of polygons that are not in a field of view, while backface culling removes those polygons that are on the back of an object and therefore can not be seen. Level of detail switching replaces a complex, detailed object with a model consisting of fewer polygons when it is anticipated that the details can not be seen in the final image. This may be the case, for example, when the object is far away from the viewpoint. Such techniques are typically implemented into a graphics processing unit (GPU). However, even after using such techniques, there are often still too many polygons for today's hardware to render. The problem is that scenes, such as in a game, often have very high depth complexity, that is, many layers of geometry underneath each pixel.

Another approach, known as occlusion culling, identifies and removes those polygons that are hidden behind or occluded by other objects in the scene. As such, occlusion culling is a hidden surface removal algorithm that pre-computes visibility of polygons before rendering, to reduce the load on the hidden surface removal done in graphics hardware. However, although in theory occlusion culling can remove a large number of invisible polygons, the computational cost of traditional occlusion culling approaches is often high. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a system, apparatus, and method for use in occlusion culling of polygons in an interactive environment, such as an interactive computer game. The invention employs a boundary box to simplify the testing of occludee polygons. Occluders and occludees are also transformed into non-interpenetrating, non-overlapping polygons. Winged-edges are employed to minimize a per occludee computational cost due to precision problems that may arise due to creation of the non-overlapping edges. The invention then proceeds through an active edge list to identify edge discontinuities (e.g., where an edge is added or removed from the active edge list). A depth analysis algorithm is employed to determine whether an occluder occludes an occludee at the edge discontinuity. Moreover, the invention performs depth analysis for those locations of a screen display where an occludee is known to reside, thereby minimizing unnecessary computations.

Illustrative Operating Environment

Figure 1:
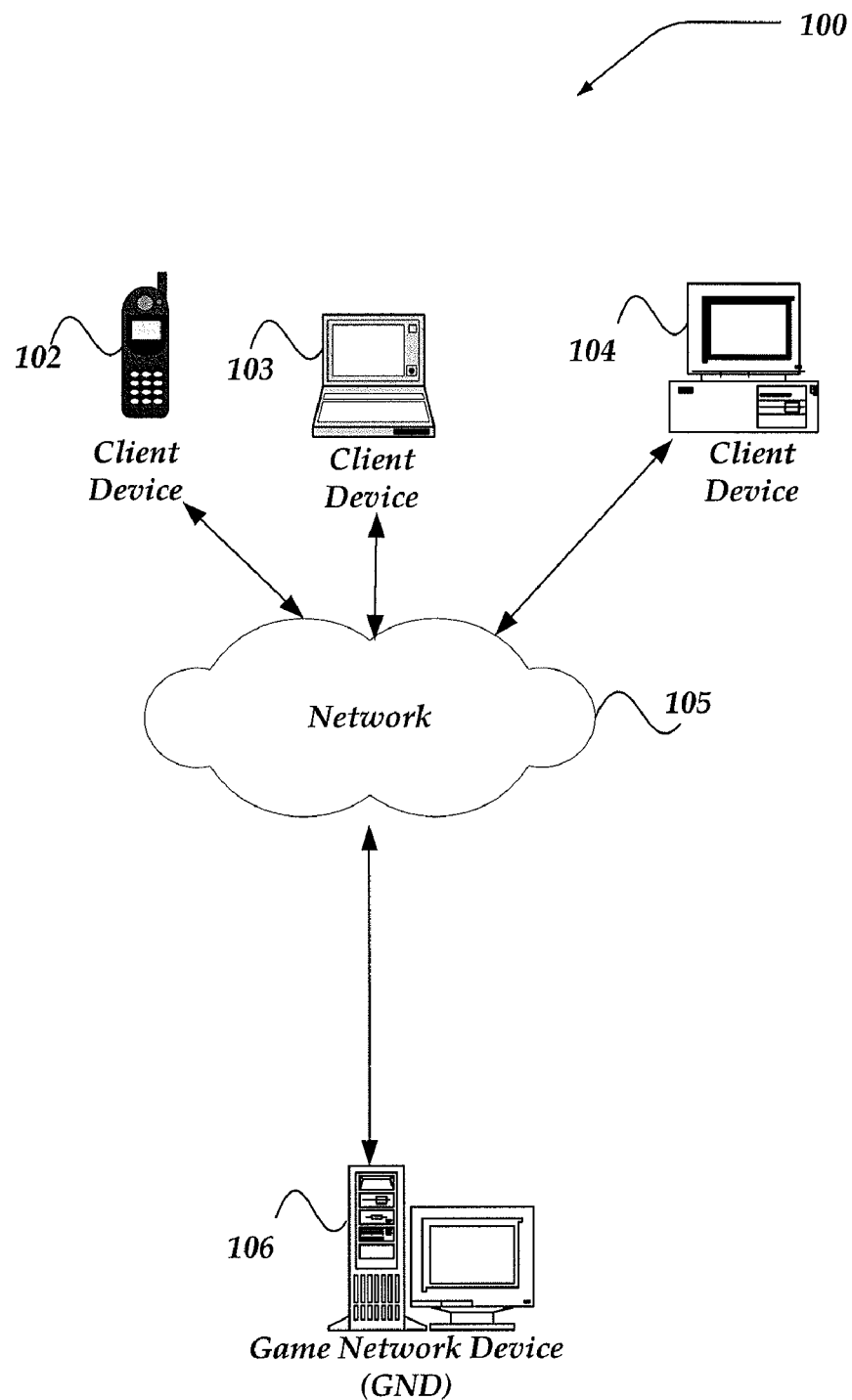
FIG. 1 illustrates one embodiment of an environment in which the invention operates.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, and Game Network Device (GND) 106. Network 105 enables communication between client devices 102-104, and GND 106.

Generally, client devices 102-104 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may further include a client application, and the like, that is configured to manage the actions described above.

Moreover, client devices 102-104 may also include a game client application, and the like, that is configured to enable an end-user to interact with and play a game, an interactive program, and the like. The game client may be configured to interact with a game server program, or the like. In one embodiment, the game client is configured to provide various functions, including, but not limited to, authentication, ability to enable an end-user to customize a game feature, synchronization with the game server program, and the like. The game client may further enable game inputs, such as keyboard, mouse, audio, and the like. The game client may also perform some game related computations, including, but not limited to, audio, game logic, physics computations, visual rendering, and the like. In one embodiment, client devices 102-104 are configured to receive and store game related files, executables, audio files, graphic files, and the like, that may be employed by the game client, game server, and the like.

In one embodiment, the game server resides on another network device, such as GND 106. However, the invention is not so limited. For example, client devices 102-104 may also be configured to include the game server program, and the like, such that the game client and game server may interact on the same client device, or even another client device. Furthermore, although the present invention is described employing a client/server architecture, the invention is not so limited. Thus, other computing architectures may be employed, including but not limited to peer-to-peer, and the like.

Network 105 is configured to couple client devices 102-104, and the like, with each other, and to GND 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), Code Division Multiple Access 2000 (CDMA 2000) and the like.

Furthermore, remote computers and other related electronic devices could be remotely connected to either LANs or WANs via a modem and temporary telephone link. In essence, network 105 includes any communication method by which information may travel between client devices 102-104 and GND 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

GND 106 is described in more detail below in conjunction with FIG. 2. Briefly, however, GND 106 includes virtually any network device configured to include the game server program, and the like. As such, GND 106 may be implemented on a variety of computing devices including personal computers, desktop computers, multiprocessor systems, microprocessor-based devices, network PCs, servers, network appliances, and the like.

GND 106 may further provide secured communication for interactions and accounting information to speedup periodic update messages between the game client and the game server, and the like. Such update messages may include, but are not limited to a position update, velocity update, audio update, graphics update, authentication information, and the like.

Illustrative Server Environment

Figure 2:
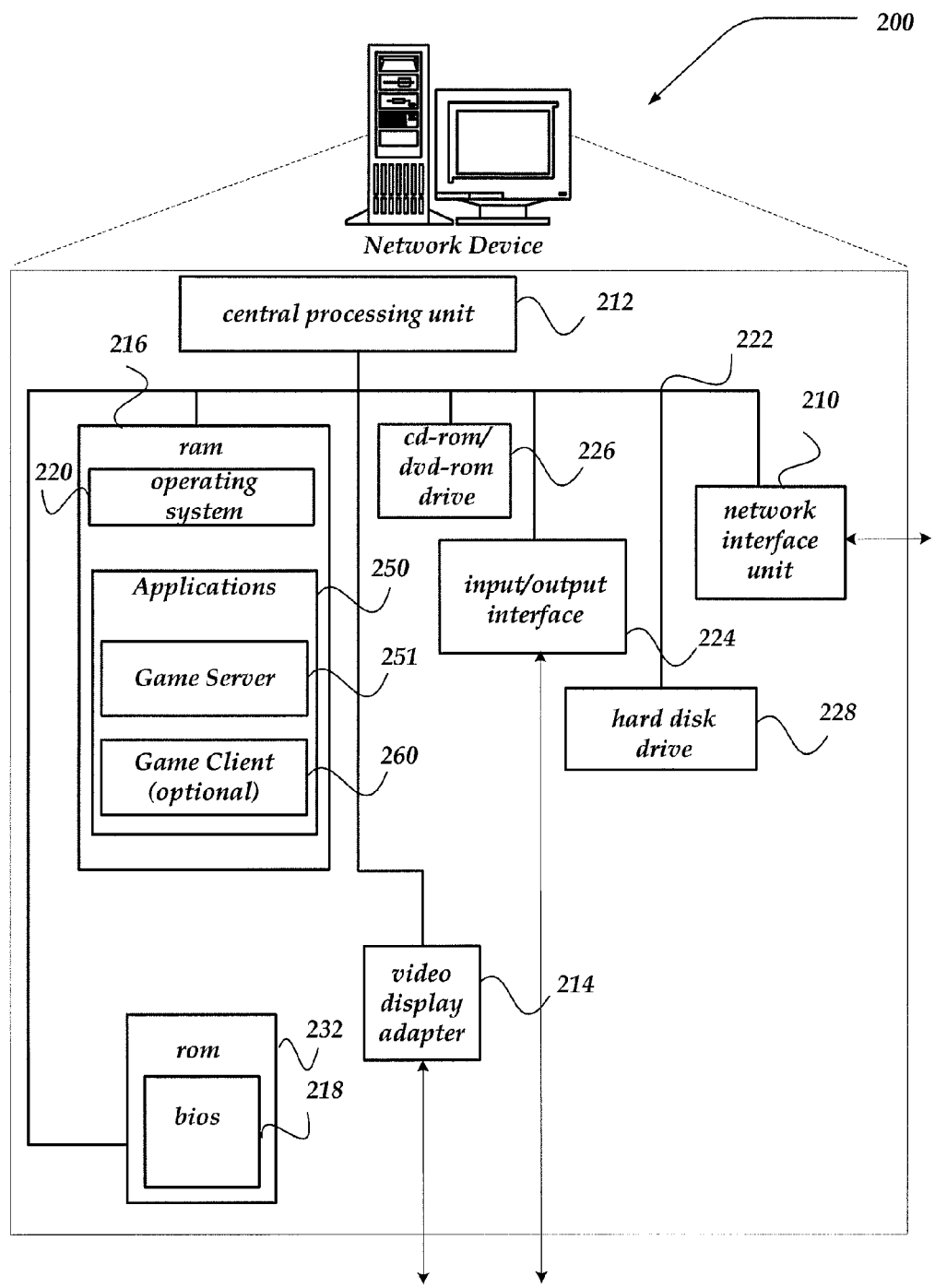
FIG. 2 shows a functional block diagram of one embodiment of a network device configured to operate with a game server.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, GND 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-104 of FIG. 1. Network interface unit 210 is sometimes known as a transceiver, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game server 251 and optional game client 260.

Figure 3:
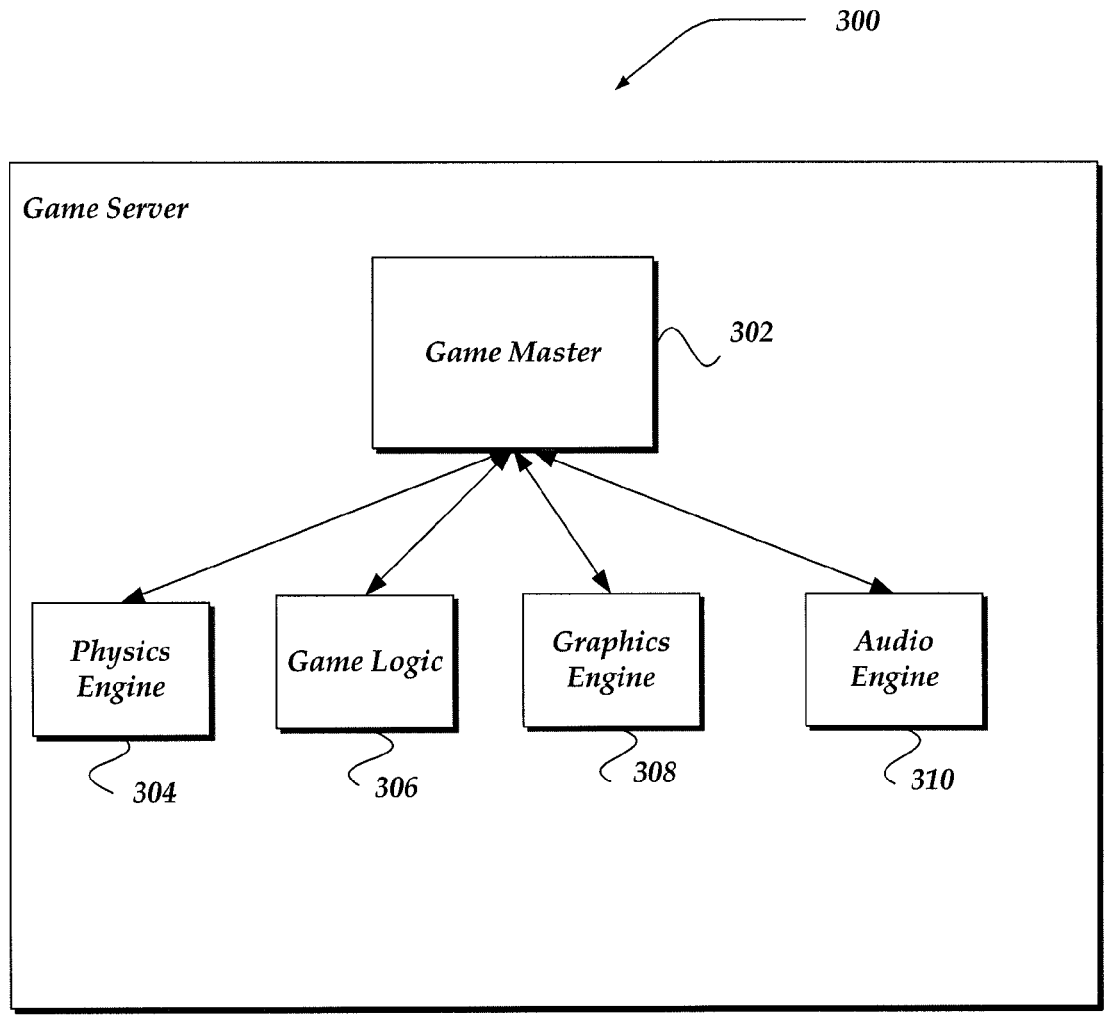
FIG. 3 illustrates a function block diagram of one embodiment of the game server of FIG. 2.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client residing on a client device, such as client devices 102-105 of FIG. 1 and/or optional game client 260 residing on network device 200. Game server 251 may also interact with other components residing on the client device, another network device, and the like. For example, game server 251 may interact with a client application, security application, transport application, and the like, on another device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a function block diagram of one embodiment of a game server for use in GND 106 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 300 includes game master 302, physics engine 304, game logic 306, graphics engine 308, and audio engine 310.

Game master 302 may also be configured to provide authentication, and communication services with a game client, another game server, and the like. Game master 302 may receive, for example, input events from the game client, such as keys, mouse movements, and the like, and provide the input events to game logic 306, physics engine 304, graphics engine 308, audio engine 310, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 may further manage interactions between physics engine 304, game logic 306, graphics engine 308, and audio engine 310.

Game logic 306 is in communication with game master 302, and is configured to provide game rules, goals, and the like. Game logic 306 may include a definition of a game logic entity within the game, such as an avatar, vehicle, and the like. Game logic 306 may include rules, goals, and the like, associated with how the game logic entity may move, interact, appear, and the like, as well. Game logic 306 may further include information about the environment, and the like, in which the game logic entity may interact. Game logic 306 may also included a component associated with artificial intelligence, neural networks, and the like.

Physics engine 304 is in communication with game master 302. Physics engine 304 is configured to provide mathematical computations for interactions, movements, forces, torques, collision detections, collisions, and the like. In one embodiment, physics engine 304 is a provided by a third party. However, the invention is not so limited and virtually any physics engine 304 may be employed that is configured to determine properties of entities, and a relationship between the entities and environments related to the laws of physics as abstracted for a virtual environment.

Graphics engine 308 is in communication with game master 302 and is configured to determine and provide graphical information associated with the overall game. As such, graphics engine 308 may include a bump-mapping component for determining and rending surfaces having high-density surface detail. Graphics engine 308 may provide an ambient light component for rendering ambient light effects, and the like. Graphics engine 308 may also include additional components that are employable for managing and storing such information, as map files, entity data files, environment data files, color palette files, texture files, and the like.

Graphics engine 308 may include a polygon component for rendering three-dimensional objects. In one embodiment, graphics engine 308 is configured to provide a high-performance occlusion system that improves on traditional occlusion techniques. Such improvements include, testing a depth value of a polygon for occlusion if an edge is added or removed from an active edge list (AEL), performing the depth test at those portions of a screen where an occludee polygon is known to reside, and transforming overlapping occluder polygons into non-overlapping occluder polygons with winged edges to address any precision issues. Graphics engine 308 is not limited to these techniques of the invention, and may also include additional techniques, including using potential viewing sets (PVS), portals, octrees, binary space partitioning (BSP), and similar visibility culling techniques. Graphics engine 308 may employ processes substantially similar to those described below in conjunction with FIGS. 7-12.

Audio engine 310 is in communication with game master 302 and is configured to determine and provide audio information associated with the overall game. As such, audio engine 310 may include an authoring component for generating audio files associated with position and distance of objects in a scene of the virtual environment. Audio engine 310 may further include a mixer for blending and cross fading channels of spatial sound data associated with objects and a character interacting in the scene.

In another embodiment, a game client can be employed to assist with or solely perform single or combinatorial actions associated with game server 300, including those actions associated with game master 302, audio engine 310, graphics engine 308, game logic 306, and physics engine 304.

Illustrative Examples for Use in Modified Scan Conversion

Figure 4:
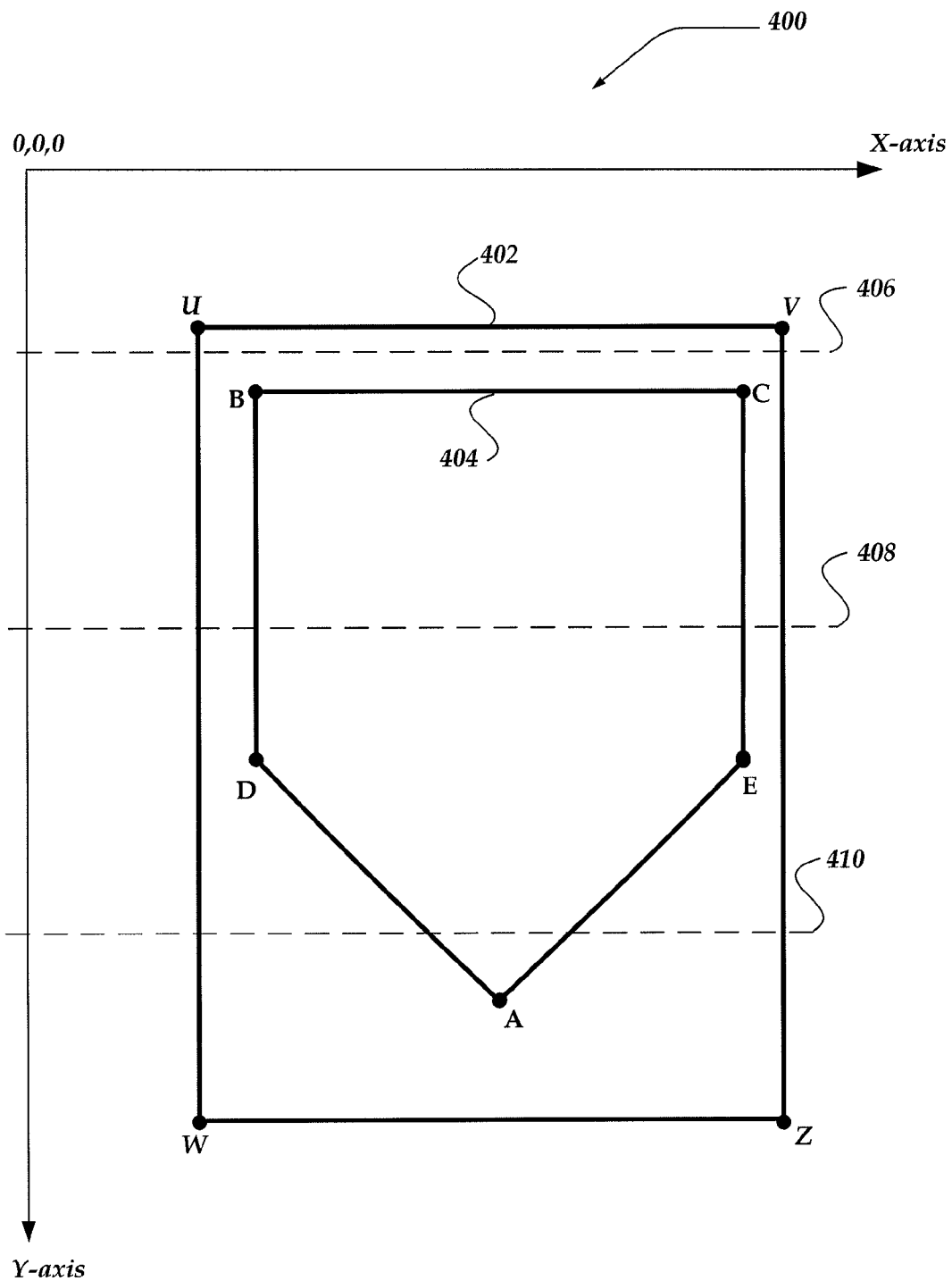
FIG. 4 shows one example of a pictorial diagram of an occluder polygon and an occludee polygon.

FIG. 4 shows one example of a pictorial diagram of an occluder polygon and an occludee polygon in screen space, in accordance with the present invention. As shown, occluder polygon 402 is assumed to completely occlude occludee polygon 404. Occluder polygon 402 includes edges UV, UW, VZ, and WZ. Occludee polygon 404 includes edges BD, BC, DA, AE, and CE. Occludee polygon 404 is assumed to represent a boundary box that envelopes a corresponding more complex set of polygons to be drawn. For example, in the interactive computer game environment, occludee polygon 404 may represent a boundary box that envelopes a warrior, vehicle, and the like. Rather than testing of a more complex set of smaller polygons, the present invention simplifies the geometry for occlusion culling by replacing the smaller occludee polygon set with a single larger occludee boundary box—occludee polygon 404. Such simplification is directed at reducing the number of edges that need to be tested during a scan conversion.

Moreover, the present invention performs actions in the central processing unit (CPU) in screen space rather than employing such hardware as a graphics processing unit (GPU) because some of the operations used by the present invention may be (sorting, etc.) impractical to implement in the instruction sets provided by current GPUs.

The present invention structures the occluder and occludee polygons to be convex and non-interpenetrating. Any of a variety of techniques may be employed to transform these polygons into a set of non-interpenetrating, convex polygons.

Figure 5:
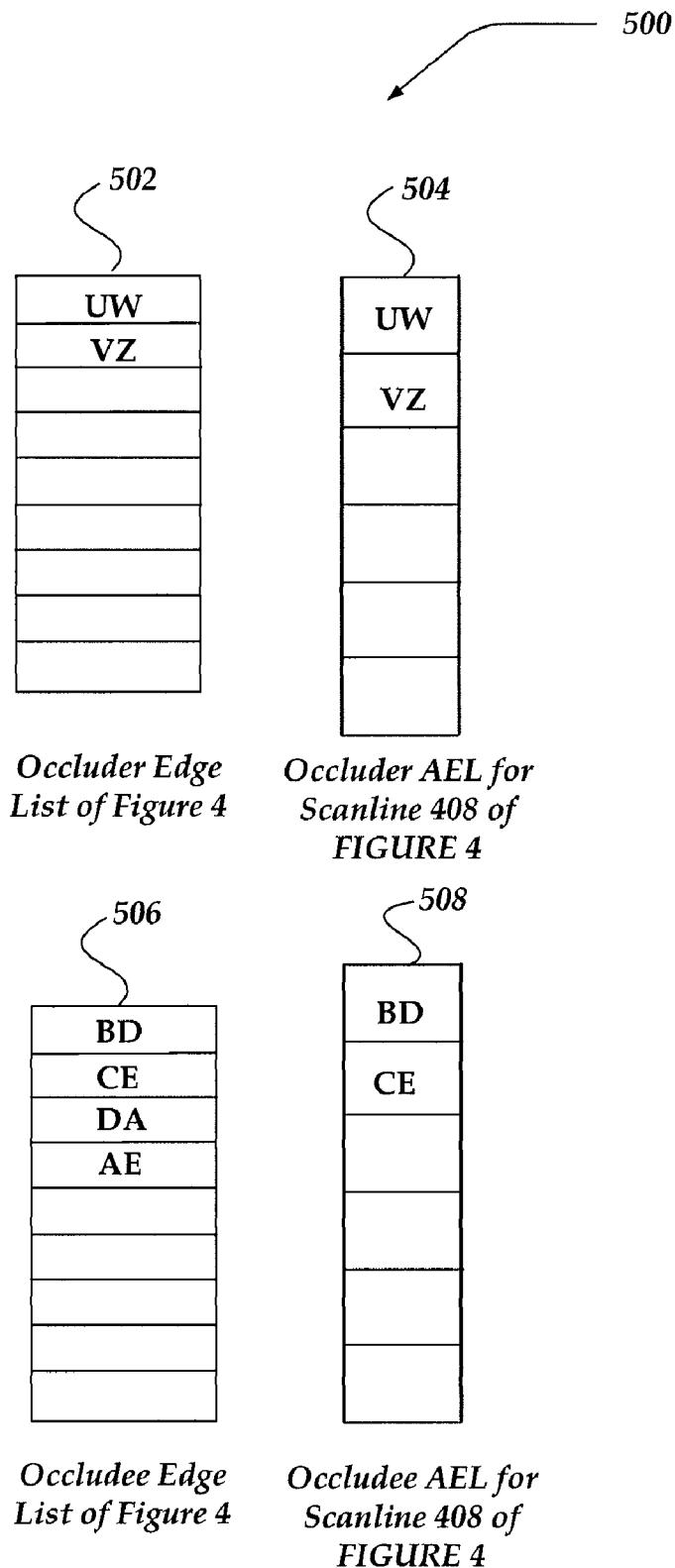
FIG. 5 illustrates a functional diagram of one embodiment of edge lists and active edge lists for the occluder and occludee polygons of FIG. 4.

The present invention employs a variant of the polygon scan-conversion approach to determine whether occluder polygon 402 is occluding occludee polygon 404. Essentially, the basic principle of the scan-conversion algorithm for polygons is to find for each y scan line the intersections of the y scan line with polygon edges. The polygon scan-conversion algorithm typically employs two data structures: an edge list (EL), and an active edge list (AEL). FIG. 5 illustrates a functional diagram of one embodiment of edge lists and active edge lists for the occluder and occludee polygons for FIG. 4. As shown in FIG. 5, associated with occluder polygon 402 of FIG. 4 are EL 502 and EAL 504. Associated with occludee polygon 404 of FIG. 4, in FIG. 5 are EL 506 and AEL 508.

An edge list typically is a list of edge records, with a record for each non-horizontal edge of the polygon. Although not shown, an edge list record typically corresponds to a line from (xmin, ymin) to (xmax, ymax), with the edge list being sorted in increasing order of ymin for the edges, followed by x values, then by edge slopes. An active edge list includes a list for edge records of those edges which intersect the current scan line. In FIG. 5, the current scan line corresponds to scan line 408 of FIG. 4. Entries in the active edge lists are sorted by ascending x, then by ascending edge slopes for the current y scan line value. Thus, as shown in FIG. 5, EL 502 includes edges non-horizontal edges UW and VZ. EL 504 includes non-horizontal edges UW and VZ. EL 506 includes non-horizontal edges BD, CE, DA, and AE, while AEL 508 includes non-horizontal edges BD and CE.

These data structures may then be employed to determine whether occludee polygon 404 is occluded by occluder polygon 402, as described in more detail below in conjunction with FIGS. 7-11.

Figure 6A:
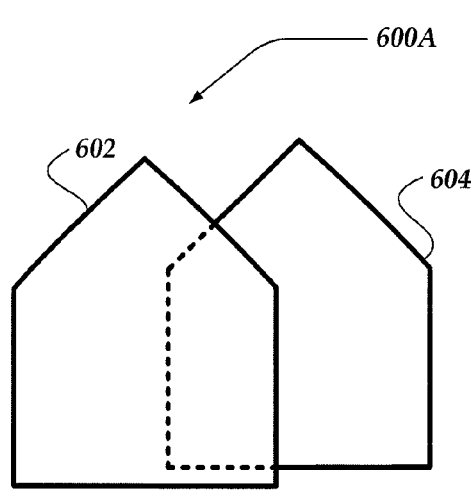
FIGS. 6A-6D illustrate functional diagrams of one embodiment of transforming overlapping polygons into non-overlapping polygons.
Figure 6B:
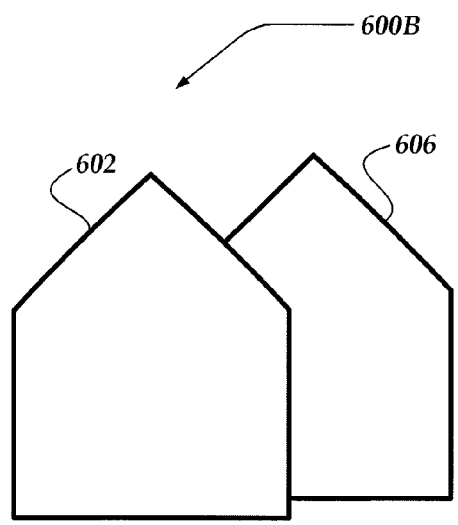
Figure 6C:
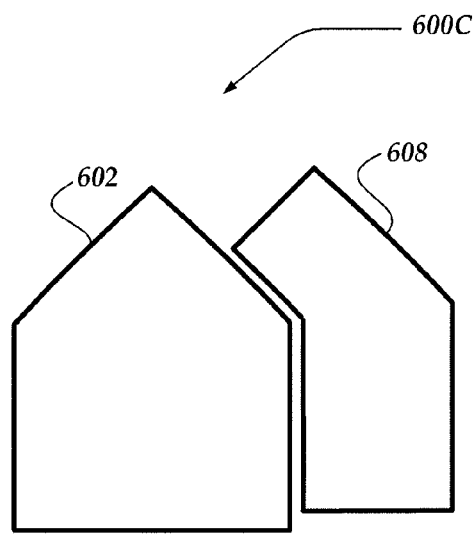
Figure 6D:
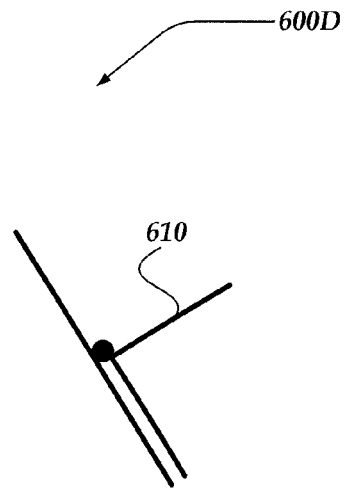

FIGS. 6A-6D illustrate functional diagrams of one embodiment of transforming overlapping polygons into non-overlapping polygons. FIG. 6A illustrates one example of overlapping occluder polygons 602 and 604. Such configuration may increase the complexity of performing depth analysis. Therefore, the present invention simplifies the configuration by truncating a portion of the polygon that is hidden (behind) the other polygon. Both polygons however retain their respective depth information. This may be seen in FIG. 6B, where polygon 606 has been truncated. However, truncation of polygons may sometimes result in edges that do not line up precisely against each other. That is, polygons 602 and 606 may actually have some separation between them, as illustrated in FIG. 6C with polygons 602 and 608. This may arise for example, during the truncation process due to round-off errors and similar computational imprecisions. The resulting gap, as seen in FIG. 6C may result in additional and unnecessary edges which would need to be tested during occlusion culling. The gap may also result in drawing of an occludee that would not otherwise be required. Therefore, the present invention employs a concept known as winged-edges to 'close the gap' between the non-overlapping polygons. A process for generating winged-edges is described in more detail below in conjunction with FIG. 12. Briefly, however, as seen in FIG. 6D, a winged-edge is constructed by generating a T-junction, such that the corresponding polygon edges appear to start and end at a same point. This is accomplished by introducing a new point for the polygons with a new edge.

Modified Scan Conversion

Figure 7:
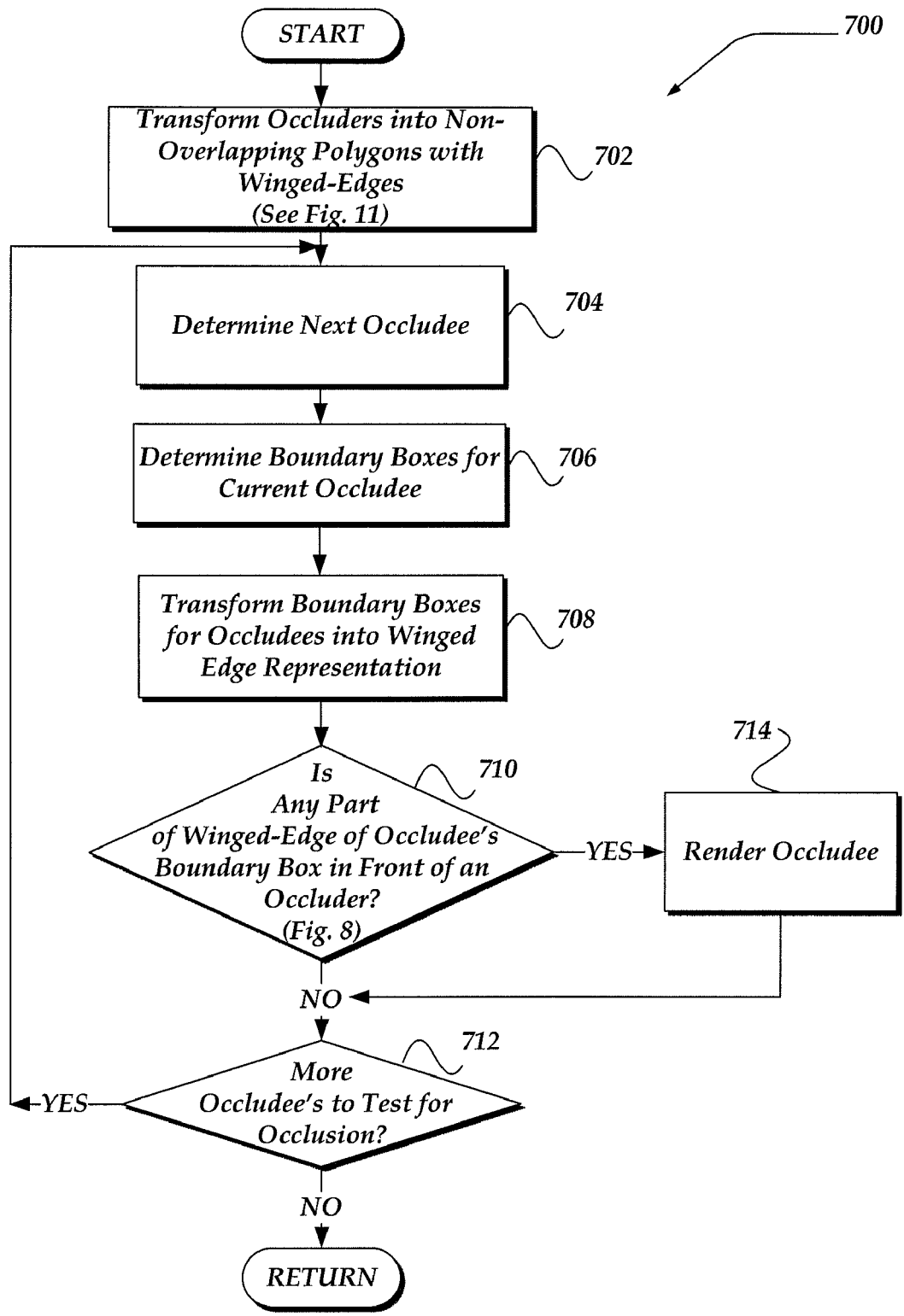
FIG. 7 shows a flow diagram generally showing one embodiment of a process of managing modified occlusion culling with winged-edges.

FIG. 7 illustrates a flow diagram showing one embodiment of an overview process of performing modified occlusion culling with winged-edges.

Process 700 of FIG. 7 begins, after a start block, at block 702, where each occluder within screen space if transformed into non-overlapping occluder polygons with winged-edges. Block 702 is described in more detail below, in conjunction with FIG. 11. Upon completion of block 702, processing flows to block 704, where a next occludee is determined. Determining the next occludee may be achieved by scanning the scene graph (a list of all things to draw in the scene) to locate an occludee that has not been drawn (rendered).

Process 700 flows next to block 706, where a boundary box is determined for the current occludee. Determining a boundary box for the occludee may be achieved by determining the simplest geometric shape that sufficiently surrounds and envelopes the current occludee. The boundary box is intended to reduce the number of polygons and thus the number of edges that will need to be tested against for possible occlusion. The resulting boundary box is directed towards a simple geometry of a large convex polygon with a low vertex count. At the same time, the boundary box is configured to preserve contours and therefore, the occlusion potential, of the original occludee polygon. Any of a variety of mechanisms may be employed to determine the boundary box, and the invention is not constrained to a particular mechanism.

Processing next flows to block 708, where the boundary boxes for the occludees are transformed in winged-edge representations employing a mechanism substantially similar to that described below in conjunction with FIG. 11. For ease of illustration of the remaining processes, the boundary box is considered to be synonymous with its bounded occludee.

Next, processing proceeds to decision block 710, where a determination is made whether any part of the occludee's boundary box is in front of an occluder. This determination is described in more detail below, in conjunction with FIG. 8. If it is determined that no portion of the occludee's boundary box is in front of the occluder, processing proceeds to decision block 712; otherwise, processing branches to block 714, where the entire occludee is to be drawn (rendered). Processing continues next to decision block 712.

At decision block 712, a determination is made whether there are any more occludees to be tested for occlusion. If there are more, processing loops back to block 704 to continue as described above; otherwise, processing returns to a calling process to perform other actions.

Figure 8:
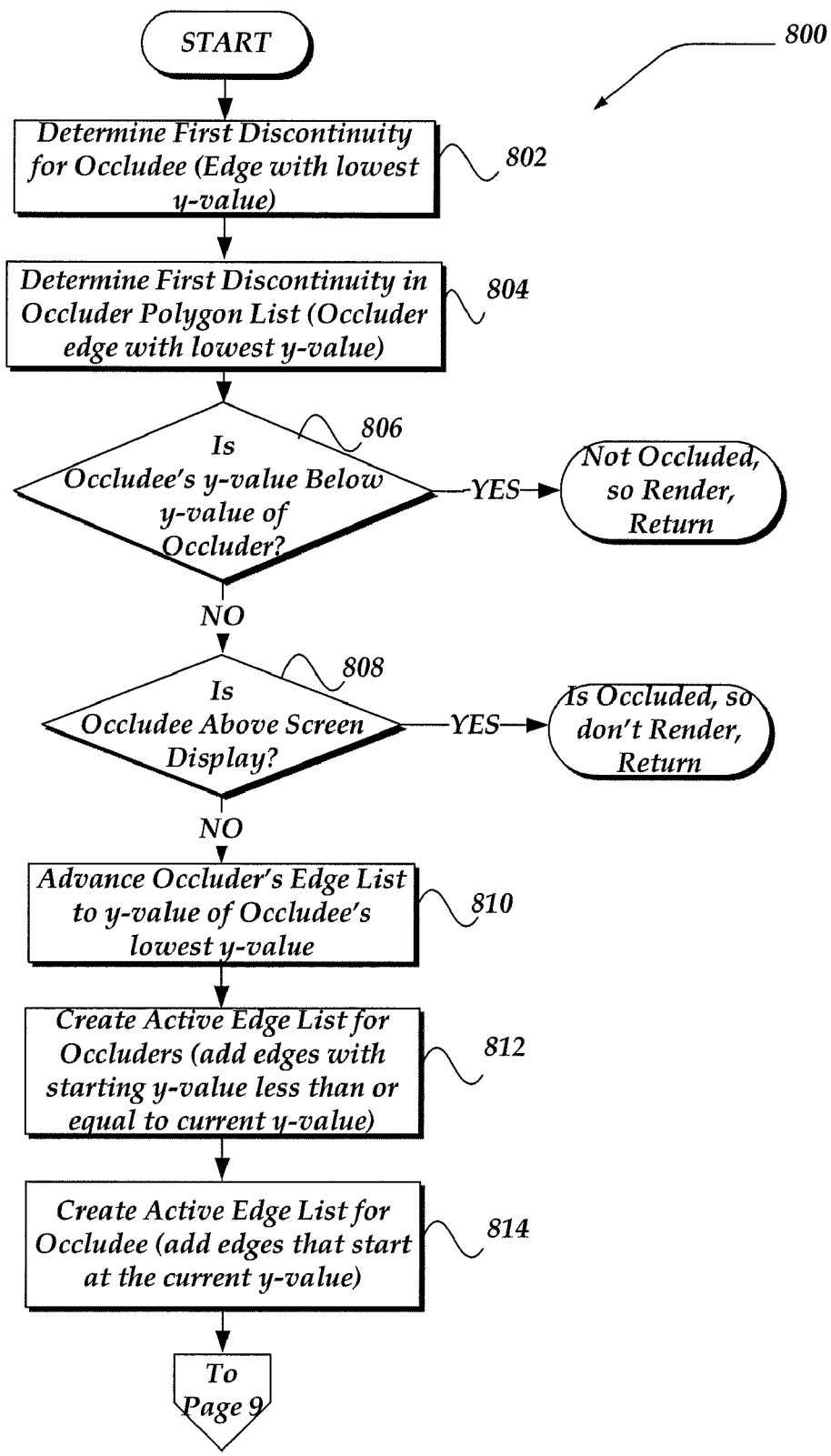
FIGS. 8-9 shows a flow diagram generally showing one embodiment of a process of determining occlusion of an occludee polygon.
Figure 9:
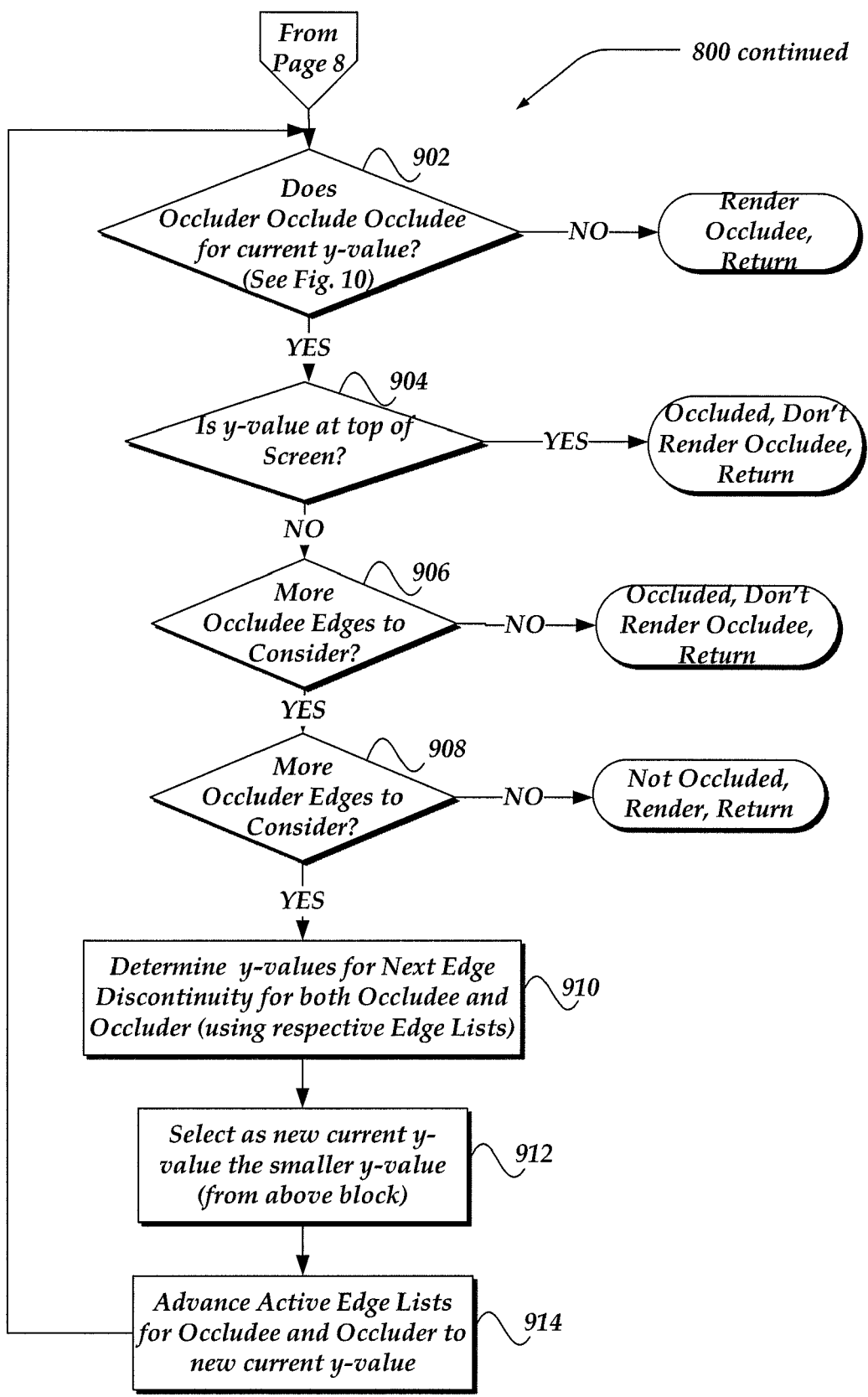

FIGS. 8-9 shows a flow diagram generally showing one embodiment of a process of determining occlusion of an occludee polygon. Briefly, as shown in the figures, y-values for each occludee and occluder are examined at a discontinuity. A discontinuity may arise where an edge is added, removed, or crosses within an Active Edge List.

Process 800 begins, after a start block, at block 802, where a first discontinuity is determined for the current occludee. The first discontinuity typically arises at the edge with the lowest y value.

Processing continues next to block 804, where a first discontinuity is determined for the occluder. The first discontinuity typically arises at the edge with the lowest y value for the occluder.

Processing continues to decision block 806, where a determination is made whether the occludee's y value is below the y value of the occluder? If it is, then the occludee is not occluded, and the occludee is drawn (rendered). Processing then returns to a calling process to perform other actions. If, however, the occludee's y value is not below the y value of the occluder, then there is a y value for which an edge of the occludee may not be occluded, and thus, processing continued to decision block 808.

At decision block 808, a determination is made whether the occludee's y value indicates that the occludee is above the screen display. That is, is the occludee not visible on the screen? If the occludee is above the screen display, the occludee need not be drawn, and the process returns to the calling process to perform other actions. Otherwise, if the occludee is within the screen display, therefore, processing proceeds to block 810.

At block 810, at this juncture, it is known that the first discontinuity is associated with the occluder. So, advance the occluder's edge list to the y value of the occludee's lowest y value (the lowest point on the occludee). This is directed at saving computations by reducing the number of y values that are tested.

Process 800 continues next to block 812, where an active edge list is created for the occluder. This is achieved by adding to the occluder active edge list all edges with a starting y value that is less than or equal to the current y value (e.g., edges that cross the current y value). This is directed towards not having to added edges of any occluder that is below the current occludee, thereby saving additional computational overhead.

Processing continues to block 814, where an active edge list is created for the occludee by adding those edges that start at the current y value.

Processing continues, next to (FIG. 9) at decision block 902, where a determination is made whether the occluder occludes the occludee at the current y value. This determination is described in more detail below, in conjunction with FIG. 10. Briefly, however, a comparison is made over the active edge lists by evaluating depth values for the occludee and occluder at the current y value. In one embodiment, the depth values are determined based on a comparison of z values for each edge. By performing this depth value test at points of discontinuities, computations need not be performed at every y value, saving potentially significant computational overhead. If it is determined that the occludee is not occluded, then the occludee is to be drawn, and processing returns to perform other actions. Otherwise, processing continues to decision block 904.

At decision block 904, a determination is made, whether the current y value is at the top of the screen space. If it is, then that is the last edge that is to be tested, as anything above this value is occluded, as it is above the screen space. Thus, the occludee is occluded and need not be drawn, processing therefore returns to perform other actions. Otherwise, processing continues to decision block 906.

At decision block 906, a determination is made whether there are any more occludee edges to be considered. If there are more occludee edges to consider, processing flows to decision block 908; otherwise, the occludee is considered to be occluded, the occludee is not drawn and processing returns to perform other actions.

At decision block 908, a determination is made whether there are any more occluder edges to consider. If there are no more occluder edges to be considered, then the occludee is not occluded, and should be drawn. Processing then returns to perform other actions. Otherwise, if there are more occluder edges, processing flows to block 910.

At block 910, based on the edge lists, the next y values are determined at which an edge discontinuity arises (e.g., an edge is added or removed) for both the occluder and occludee edge lists.

Processing flows, next to block 912 where the smallest of the two y values obtained at block 910 is selected as the current y value. Process 800 proceeds to block 914, where the active edge lists for the occluder and occludee are advanced to the new current y value, skipping unnecessary y values. Processing then loops back to decision block 902, to continue until there are no more occludee edges or occluder edges to consider.

Figure 10:
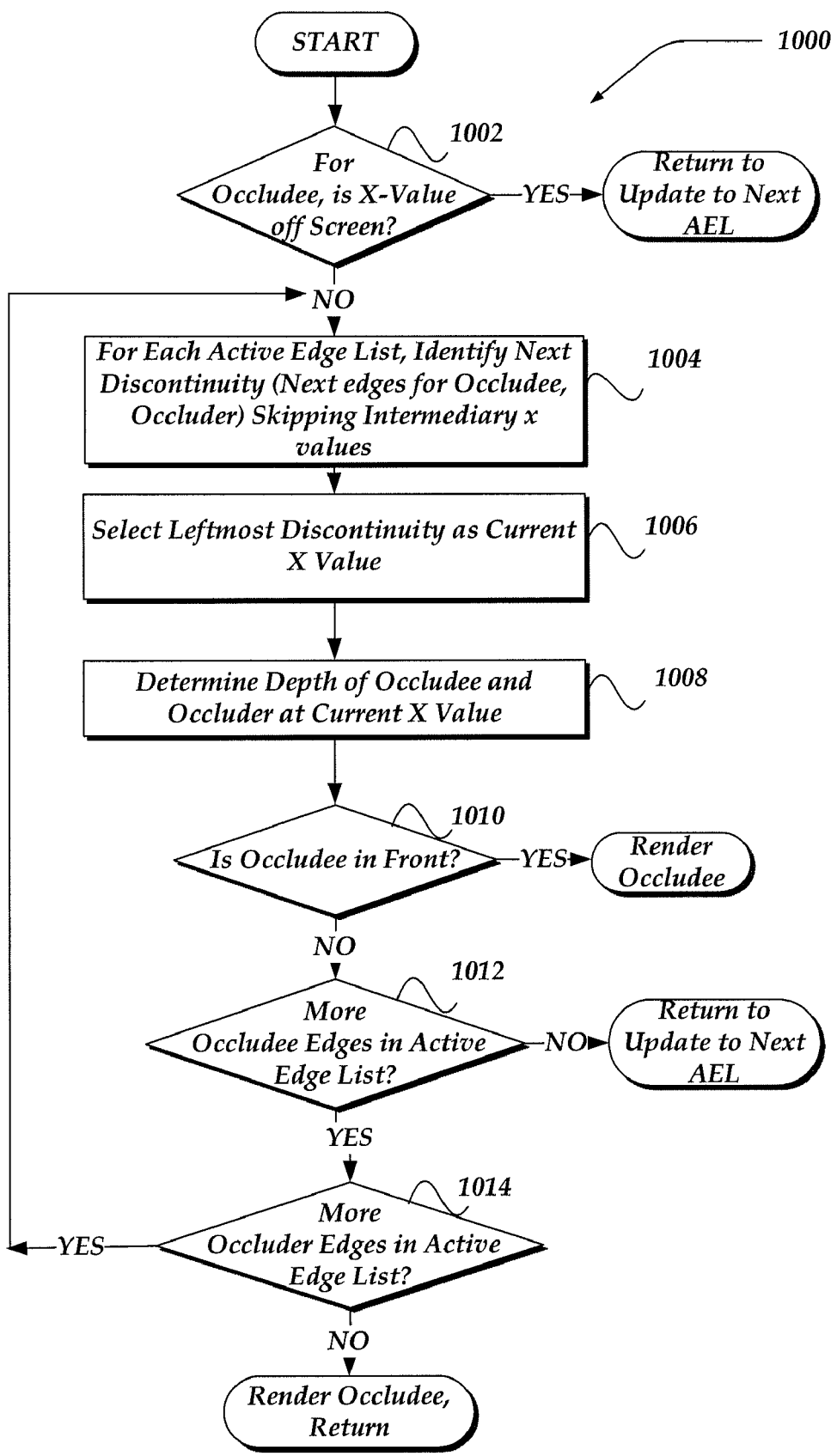
FIG. 10 shows a flow diagram generally showing one embodiment of a process of performing a depth test for determining occlusion.

FIG. 10 shows a flow diagram generally showing one embodiment of a process of performing a depth test for determining occlusion. Briefly, process 1000 of FIG. 10 performs depth tests at the points of discontinuities in the two active edge lists of winged-edges for a particular y value.

Process 1000 begins, after a start block, at decision block 1002, where a determination is made whether the occludee is out of the current screen space. This may be determined based on the current x value for the occludee and whether it is outside of the current screen space. If it is determined to be outside of the current screen space, the processing returns to perform other actions, such as updating to a next active edge list. Otherwise, processing continues to block 1004.

At block 1004, taking both the active edge lists for the occludee and the occluder, locate the first discontinuity in the x values. This determination identifies a discontinuity for the occluders and another discontinuity for the occludees. Because discontinuities do not occur at every x-value, such action results in skipping of intermediary x values.

Processing continues next to block 1006, where the leftmost discontinuity of the two x values is selected as the current x value. Processing flows next to block 1008, where a depth value for the occludee and occluder at the current x value. Determination of depth values may be accomplished employing any of a variety of mechanisms. For example, in one embodiment, z values for the occluder and occludee may be determined employing planar equations at the current x and y values.

Processing continues to decision block 1010, where a determination is made whether the occludee is in front of the occluder based on the z values determined at block 1008 above. If the occludee is not occluded, then it is to be drawn, and processing then returns to perform other actions. Otherwise, if the occludee is not in front, then processing continues to decision block 1012, where a determination is made whether there are more occludee edges in the occludee active edge list. If there are no more, then this occludee is done, and process 1000 returns to update to the next active edge lists.

Otherwise, processing continues to decision block 1014, where a determination is made whether there are any more occluder edges in the active edge list for occluders. If there are no more occluder edges, then the occludee is drawn (rendered) and the process returns to perform other actions. Otherwise, processing loops back to block 1004 to update the current x value along the edge lists to continue testing points along the active edge lists.

Figure 11:
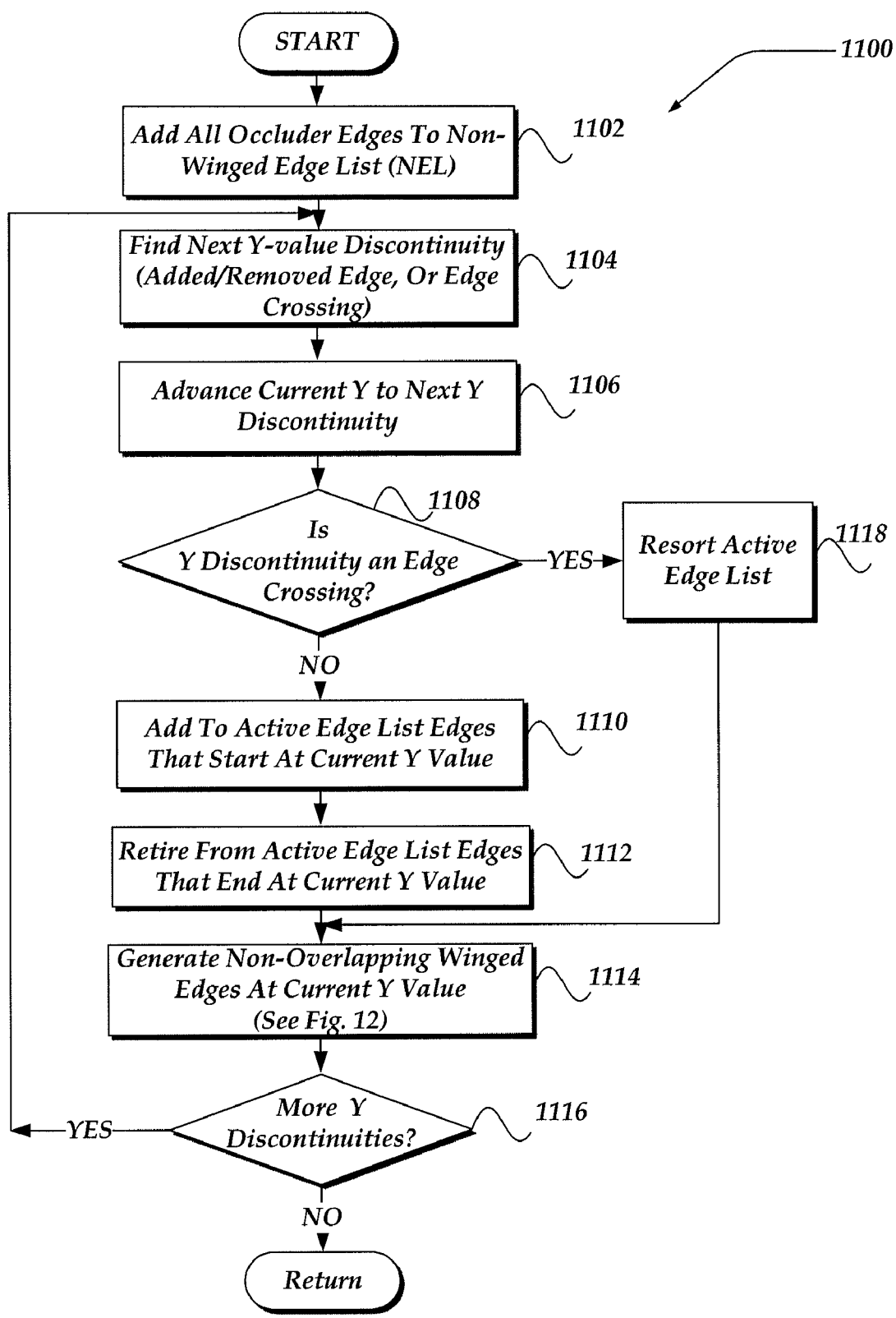
FIG. 11 shows a flow diagram generally showing one embodiment of a process of transforming occluders into non-overlapping polygons with winged edges.

FIG. 11 shows a flow diagram generally showing one embodiment of a process of transforming occluders into non-overlapping polygons with winged edges. As shown in the flow diagram, process 1100 non-winged edge lists are employed that are sorted by y values, then x values, then slopes of the lowest point on the edge. Moreover, active edge lists are sorted by x values at the current y value, then by slopes of the edges.

Process 1100 of FIG. 11 begins, after a start block, at block 1102, where all occluder edges are added to a non-winged edge list (NEL). Processing continues to block 1104, where a next y value discontinuity is located. Such discontinuities may arise, for example, where an edge is added or removed, or where an edge crossing arises.

Process 1100 continues next to block 1106, where the y value is advanced in the NEL to the current y value. Processing continues next to decision block 1108, where a determination is made whether the current y discontinuity is an edge crossing discontinuity. If it is, processing flows to block 1118, to where the current active edge list is resorted to ensure that the list is sorted by x value of the edge at the current y value, then by the edge slopes. Processing flows then to block 1114.

Alternatively, if at decision block 1108, the current y discontinuity is not an edge crossing, processing flows to block 1110, where edges are added to the active edge list that start at the current y value. Processing next flows to block 1112, where edges are removed from the active edge list that end at the current y value.

Figure 12:
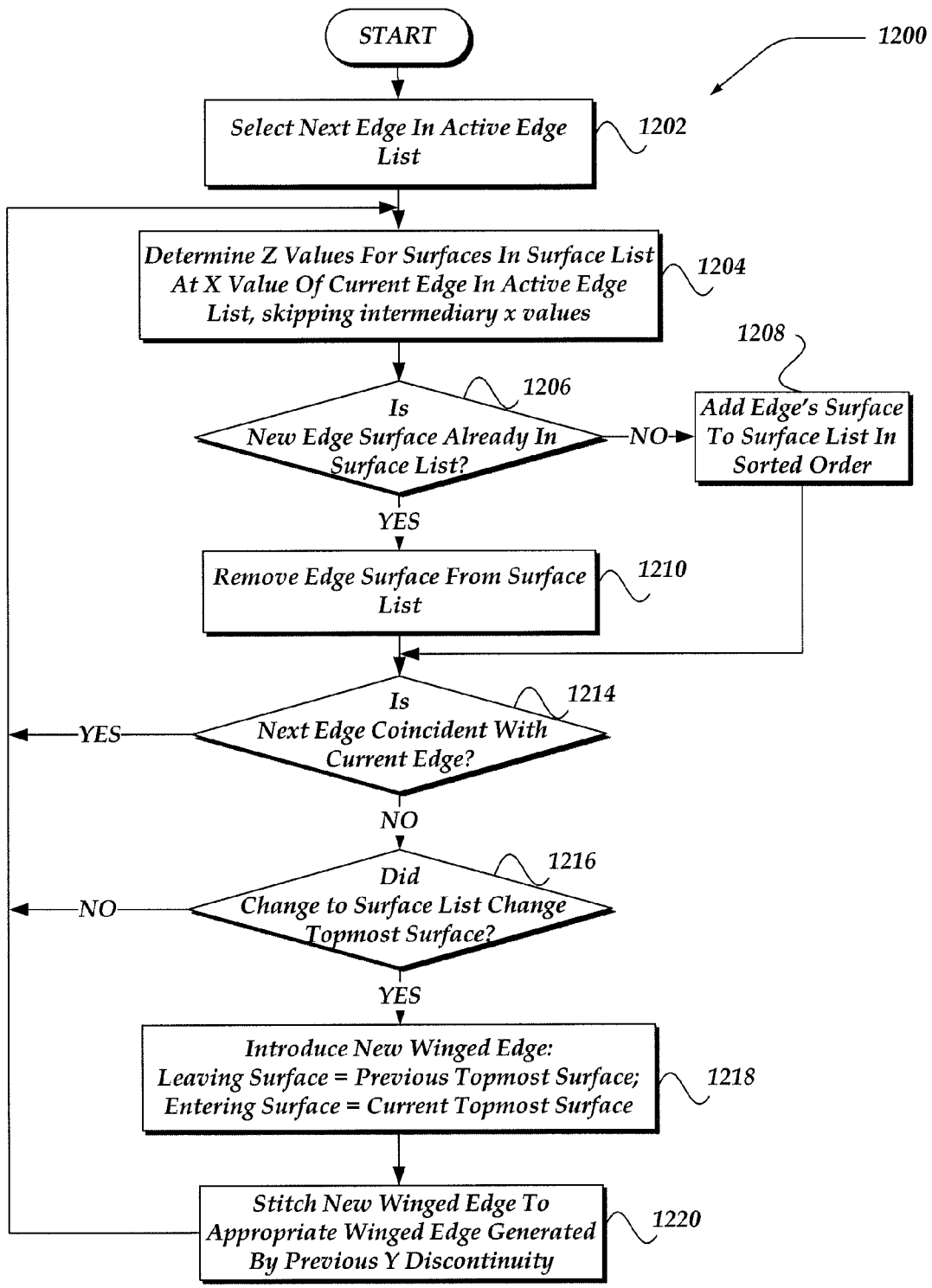
FIG. 12 shows a flow diagram generally showing one embodiment of a process for generating a winged edge on a polygon, in accordance with the present invention.

Processing flows next to block 1114, which is described in more detail in conjunction with FIG. 12. Briefly, however, at block 1114, non-overlapping winged-edges are generated at the current y value for the occluders.

Processing continues next to decision block 1116, where a determination is made whether there are more y discontinuities. If there are no more y discontinuities, then process 1100 returns to a calling process to perform other actions. Otherwise, process 1100 loops back to block 1104 where additional edges are examined for discontinuities, and winged-edges are created.

FIG. 12 shows a flow diagram generally showing one embodiment of a process for generating a winged edge on a polygon, in accordance with the present invention. Process 1200 of FIG. 12 may be called from block 1114 of FIG. 11.

Process 1200 of FIG. 12 begins, after a start block, at block 1202, where the next edge is selected from the active edge list. Processing continues to block 1204, where z values are determined for each surface in a surface list at the current x value of the current edge in the active edge list. As noted above, such actions result in the z testing occurring at those x values where occluder edges intersect the current y value, effectively skipping intermediary x values between the edges.

Processing flows next to decision block 1206, where a determination is made whether a new edge's surface is already in the current surface list, where the surfaces are the polygonal faces that the edges bound. If not, processing flows to block 1208, where the new edge's surface is added to the surface list in sorted order. In one embodiment, the sorted order of the surface list is by screen space z values, at the current x values. Because occluders are non-interpenetrating, the surface list need not be resorted, however. Processing flows next to decision block 1214.

Alternatively, if at decision block 1206, the new edge's surface is already in the surface list, processing flows to block 1210, where the edge's surface is removed from the surface list. Processing continues to decision block 1214.

At decision block 1214, a determination is made whether the new edge is coincident with the current edge. If it is coincident, processing loops back to block 1204; otherwise, processing continues to decision block 1216.

At decision block 1216, a determination is made whether the above addition or removal to the surface list change the surface that was the topmost surface in the surface list. If it did not, then processing loops back to block 1204; otherwise, processing continues to block 1218.

At block 1218, a new winged edge is introduced. A winged edge stores information about the surfaces it bounds on its left and right side. The surface on the left side may be called the 'leaving' surface and the surface on the right side is called the 'entering' surface. For the new winged edge, the entering surface is the current topmost surface, and the leaving surface is the previous topmost surface. Processing continues then to block 1220, where the new winged edge is stitched to an appropriate winged edge that was generated by the previous y discontinuity. Processing then loops back to block 1204.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server for rendering objects in a virtual environment, comprising:
   a memory for storing data; and
   a graphics engine for performing actions prior to rasterization, including:
      generating a convex polygonal representation of an occluder object and a convex polygonal representation of an occludee object, wherein the occluder and occludee objects do not interpenetrate;
      using the convex polygonal representations, generating a list of x,y ordered pairs for a screen display by inserting into the list each x,y ordered pair where an occlusion change between the occluder object and the occludee object could occur, wherein the occlusion change could occur at endpoints of an occluder object edge or an occludee object edge, or at points where an occluder object edge intersects with an occludee object edge;
      performing a depth test at each x,y ordered pair within the list of x,y ordered pairs to determine if the occluder object occludes the occludee object, such that intermediate x,y points are skipped; and
      if based on the depth test at any of the x,y ordered pairs the occludee object is determined to be un-occluded by the occluder object, enabling the occludee object to be rendered to a display screen.

2. The server of claim 1, wherein the occludee object is represented by the faces of a convex boundary box.

3. The server of claim 1, wherein the occluder object is represented by a set of convex polygons.

4. The server of claim 3, wherein the set of occluder convex polygons are transformed into a set of non-overlapping convex polygons.

5. The server of claim 1, wherein the convex polygonal representation for the occludee object comprises a winged edge list that is generated for the occludee object and wherein the non-overlapping convex polygonal representation for the occluder object comprises a winged edge list that is generated for the occluder object.

6. The server of claim 1, wherein the set of x,y value pairs is generated by:
   computing active edge lists for the occluder object edges and for the occludee object edges only at y values where an edge is added, an edge is removed, or an occluder object edge intersects an occludee object edge, skipping all intermediate y values; and
   determining the x values where each occluder object edge and occludee object edge intersects a current y value of the active edge list, skipping intermediary x values.

7. The server of claim 1, wherein the graphics engine performs actions prior to rasterization, further including:
   if at any x,y value pair, there are no occludee objects, skipping the depth test at that position;
   if at any x,y value pair, the x,y value pair lies outside the screen display, skipping the depth test at that position; and
   if at any x,y value pair, there are no occluder objects, considering the occludee object to be un-occluded, enabling rendering of the occludee object, and then exiting.

8. The server of claim 1, wherein the depth test is based on comparing a z value associated with a planar equation for the polygon of the occluder object at the x,y location, with another z value associated with another planar equation for the polygon of the occludee object at the x,y location.

9. A method operating within a processor for rendering polygons in a virtual environment prior to rasterization, comprising:
   (a) generating an edge list for a set of convex occludee polygons that comprise faces of a convex boundary box;
   (b) generating an edge list for a set of convex non-overlapping occluder polygons;
   (c) advancing to a current y value of a topmost visibility discontinuity associated with the occludee polygon, wherein a visibility discontinuity is determined to occur at each added edge, each removed edge, and each intersection of an occludee polygon edge with an occluder polygon edge;
   (d) if the current y value is determined to be below a screen display space, considering the occludee polygon to be occluded, inhibiting rendering of the occludee polygon, and then exiting;
   (e) computing active edge lists for the occludee polygon edges and the occluder polygon edges at the current y value, skipping all y values between the current y value and a previous y value; where the active edge lists are sorted by ascending x values; and (f) performing a depth test at each x value of an occludee or occluder edge in the active edge lists, skipping intermediate x values, to determine whether the occludee active edge list is occluded by the occluder active edge list at the current x, y value, and if the occludee is un-occluded, enabling rendering of the occludee polygon to a display screen, otherwise:

while more visibility discontinuities are detected within the edge lists, computing a new current y value as the y value of the next discontinuity associated with either an occluder or occludee with the smallest y value, and looping back to step (d).

10. The method of claim 9, wherein winged edge lists are used to represent the occluder polygon edges and the occludee polygon edges.

11. The method of claim 9, further comprising:
if after step (e) it is determined that the active edge list for the occludee polygon is empty, then determining that the occludee polygon is occluded, inhibiting rendering of the occludee polygon, and exit looping.

12. The method of claim 9, further comprising:
if after step (e) it is determined that the active edge list for the occluder polygon is empty, then determining that the occludee polygon is un-occluded, enabling rendering of the occludee polygon, and exiting.

13. The method of claim 9, wherein step (f) further comprises:

(I) selecting from the active edge list a leftmost occludee polygon edge's x value as the current x value;

(II) advancing within each active edge list to the current x value, such that intermediate x values are skipped;

(III) using the winged edge representations to determine planar equations for the occluder polygon and the occludee polygon at the current x value;

(IV) calculating a z value of the occluder polygon surface and another z value of the occludee polygon surface at the current x value and current y value;

(V) if the z value of the occluder polygon is greater than the z value of the occludee polygon, then determining that the occludee polygon is un-occluded and enabling rendering of the occludee polygon, and exit looping;

(VI) if there are no more edges within the active edge list for the occludee polygon, determining that the occludee polygon is occluded at the current y value, and exit looping over the active edge list at the current y value;

(VII) if there are no more edges within the active edge list for the occluder polygon, determining that the occludee polygon is un-occluded, enabling rendering of the occludee polygon, and exit looping;

(VIII) computing an x value of a next edge in the active edge list for the occluder polygons and an x value of the next edge in the active edge list for the occludee polygons; and (IX) selecting a smaller x value as a current x value, skipping intermediary x values, and looping back to step (II).

14. The method of claim 9, wherein performing the depth test further comprises comparing a z value for the occluder polygon and another z value for the occludee polygon.

15. A non-transitory, processor readable storage medium that includes data and instructions, wherein the execution of the instructions on a computing device provides for rendering a polygon in a virtual environment by enabling actions prior to rasterization, comprising:

generating a convex polygonal representation of an occluder object and a convex polygonal representation of an occludee object, wherein the occluder and occludee objects do not interpenetrate;

using the convex polygonal representations, generating a list of x,y ordered pairs for a screen display by inserting into the list each x,y ordered pair where an occlusion change between the occluder object and the occludee object could occur, wherein an occlusion change could occur at endpoints of an occluder object edge or an occludee object edge, or at points where an occluder object edge intersects with an occluder object edge;

performing a depth test at each x,y ordered pair within the list of x,y ordered pairs to determine if the occluder polygon occludes the occludee polygon, such that intermediate x, y points are skipped; and if based on the depth test at any of the x,y ordered pairs the occludee object is determined to be un-occluded by the occluder object, enabling the occludee object to be rendered to a display screen.

16. The non-transitory, processor readable storage medium of claim 15, wherein the occludee object is represented by the faces of a convex a boundary box.

17. The non-transitory, processor readable storage medium of claim 15, wherein the occluder object comprises a set of non-overlapping non convex polygons.

18. The non-transitory, processor readable storage medium of claim 15, wherein the set of x,y value pairs is generated by:

computing active edge lists for the occluder object edges and for the occludee object edges only at y values where an edge is added, an edge is removed, or an occluder object edge intersects an occludee object edge, skipping all intermediate y values; and determining the x values where each occluder object edge and occludee object edge intersects a current y value of the active edge list, skipping intermediary x values.

19. The non-transitory, processor readable storage medium of claim 15, wherein the graphics engine performs actions prior to rasterization, further including:

if at any x,y value pair, there are no occludee objects, skipping the depth test at that position;

if at any x,y value pair, the x,y value pair lies outside the screen display, skipping the depth test at that position; and if at any x,y value pair, there are no occluder objects, considering the occludee object to be un-occluded, enabling rendering of the occludee object, and then exiting.

20. The non-transitory, processor readable storage medium of claim 15, wherein the depth test is based on comparing a z value associated with a planar equation for the polygon of the occluder object at the x,y location with another z value associated with another planar equation for the polygon of the occludee object at the x,y location.

* * * * *

UNITED STATES PATENT AND TRADEMARK OFFICE
CERTIFICATE OF CORRECTION

Page 1 of 1

PATENT NO.           : 7,903,108 B2
APPLICATION NO.      : 12/196020
DATED                : March 8, 2011
INVENTOR(S)          : Brian Jacobson It is certified that error appears in the above-identified patent and that said Letters Patent is hereby corrected as shown below:

On Title Page 2, in field (56), under (Other Publications), in column 2, line 7, after "Algorithm,"" insert -- 1996, --.

In column 14, line 45, in Claim 8, delete "location," and insert -- location --, therefor.

In column 16, line 21, in Claim 15, delete "x, y" and insert -- x,y --, therefor.

Signed and Sealed this
Fifteenth Day of November, 2011

David J. Kappos
*Director of the United States Patent and Trademark Office*